Nov. 28, 1967  F. L. VARSANYI  3,355,675
LASER DEVICE USING Nd: PrCl₃
Filed Dec. 16, 1963
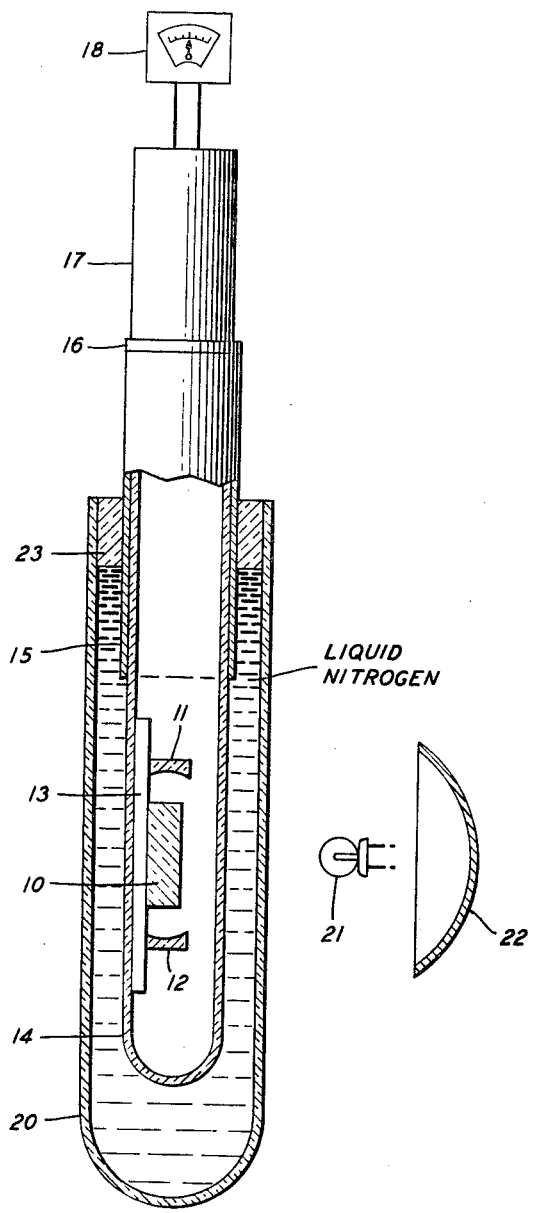
INVENTOR
F. L. VARSANYI
BY
ATTORNEY 3,355,675
LASER DEVICE USING Nd:PrCl₃
Frank L. Varsanyi, Summit, N.J., assignor to Bell Telephone Laboratories, Incorporated, New York, N.Y., a corporation of New York
Filed Dec. 16, 1963, Ser. No. 331,049
1 Claim. (Cl. 331—94.5)

ABSTRACT OF THE DISCLOSURE

The specification describes a laser device operating with Nd:PrCl₃ as the active material. The laser action is based on an energy exchange between the two rare earth ions with the praseodymium ions absorbing and the neodymium ions emitting.

---

This invention relates to a novel phosphor composition and to laser devices utilizing this composition as a negative temperature medium.

The principles of construction and operation of laser devices are now well established in the art. However, new negative temperature materials which add versatility and efficiency to the basic devices are continually being sought.

A phosphor material has now been discovered which shows unusual luminescent characteristics and which is particularly well adapted for use in laser devices. This material is praseodymium chloride containing .05% to .5% neodymium.

This material has strong absorption bands between $1\mu$ and $2.5\mu$ and a very sharp emission line at approximately $2.5\mu$. The excitation process is so efficient that a small tungsten filament lamp operating at one-tenth power and just noticeably glowing provides sufficient pumping energy to give high resolution detection of the fluorescent spectrum. The emission at $2.5\mu$ has a linewidth of 0.2 cm.$^{-1}$. The fluorescent lifetime is about 50 milliseconds.

The ease of excitation and the sharpness of the emission line is attributed to the presence of two rare earths in widely different concentrations. The absorption mechanism is linked to the praseodymium ion whereas the emission is due to a neodymium ion transition. The energy exchange is exceptionally favorable and efficient. The unusually long lifetime may be partly attributed to the exchange process.

The invention will be described in greater detail with reference to the drawing in which:

The figure is a schematic view of a laser generator adapted to employ the novel material of this invention as the negative temperature medium.

Single crystals of praseodymium chloride are grown from the melt by lowering in a sealed quartz capsule through a furnace with a temperature gradient spanning the melting temperature. This technique is the well known Stockbarger method and is described in Journal Optical Society of America, vol. 39, p. 731 (1949). The melt is prepared in the following way. Pure oxides of praseodymium and neodymium in the proper ratio are dissolved in hydrochloric acid, taken to near dryness by heating, and transferred to a quartz tube. There the drying is completed under vacuum. After all the water is driven out, the salt is melted, then transferred to a clean quartz tube and distilled under vacuum into the quartz capsule in which the crystal growing takes place.

The growth procedure essentially involves the transport of the melt-containing capsule through a temperature gradient around the solidus temperature in a manner similar to that described in Journal of Chemical Physics, vol. 29, p. 754 (1958). Particularly good results were obtained when the quartz capsule was lowered at a rate of one minute per hour from a hot zone at 850° C. to a cool zone at 750° C. separated by a spacing of approximately 50 mm. Relatively large crystals of high optical quality can be produced in this manner. Since these crystals are hygroscopic certain obvious precautions must be taken in the construction of a durable laser device. It is convenient to merely contain the crystal in a glass envelope. Such an arrangement is shown in the figure. The novel phosphor material of this invention is utilized as the negative temperature medium 10. The shape of the crystal is not critical however the most effective arrangement yet proposed requires two parallel flat surfaces. It has become conventional to employ a rod of single crystal material and to silver the flat, parallel ends of the rod. However praseodymium chloride is quite soft and difficult to machine. For the purposes described here it is considered expedient to cleave the crystal thus obtaining nearly flat and parallel end faces. The crystal is placed between two concave mirrors 11 and 12 adjacent the flat surfaces as shown.

The use of concave reflectors improves the Q of the arrangement thereby reducing the precision required for the parallelicity and flatness of the end faces of the crystal. This type of cavity geometry is described in United States Patent 3,055,257 issued Sept. 25, 1962.

The crystal and mirrors are mounted on a support member 13 with appropriate grooves or indentations to hold these elements in fixed relationship relative to each other. The mirrors are spaced so that their focal points coincide, or also can be spaced closer than confocal. This assembly is mounted in a Pyrex glass envelope 14. The envelope is evacuated and then filled with about one-third atmosphere of helium. A stainless steel or brass tube 15 is fixed to the Pyrex tube and has a window 16 to accommodate the output radiation. Detector 17 monitors the radiation and the output is displayed at meter 18. The Pyrex envelope 14 is immersed in a glass Dewar 20 with transparent tip containing liquid helium. The pumping radiation is supplied by tungsten filament 21. Reflector 22 assists in efficiently utilizing the filament output. Other sources of radiation with sufficient intensity in the $1\mu$–$2.5\mu$ region can be used as well. For pulsed excitation flash tubes are suitable as commonly used for laser devices.

This arrangement is shown by way of example only. Various other modifications and extensions of this invention will become apparent to those skilled in the art. All such variations and deviations which basically rely on the teachings through which this invention has advanced the art are properly considered within the spirit and scope of this invention.

What is claimed is:

A laser device comprising an active crystal of anhydrous praseodymium chloride containing 0.05 percent to 0.5 percent of neodymium, means for sealing the crystal from the atmosphere, and pumping means emitting over the wavelength band including $1\mu$ and $2.5\mu$ for creating an inverted electron population in the active crystal.

References Cited

UNITED STATES PATENTS 3,233,189   2/1967   Guggenheim et al. __ 331—94.5

OTHER REFERENCES

Dieke et al.: "Ion Pair Absorption in PrCl₃," Physical Review Letters, vol. 11, No. 1, July 1, 1963, pp. 17–18.

Varsanyi et al.: "Ion-Pair Resonance," Physical Review Letters, vol. 7, No. 12, Dec. 15, 1961, pp. 442–443.

JEWELL H. PEDERSEN, *Primary Examiner.*

E. S. BAUER, R. L. WIBERT, *Assistant Examiners.*